Oct. 10, 1933.  J. M. BOYKOW  1,930,082
GYROSCOPIC COMPASS
Filed March 20, 1929    3 Sheets-Sheet 1
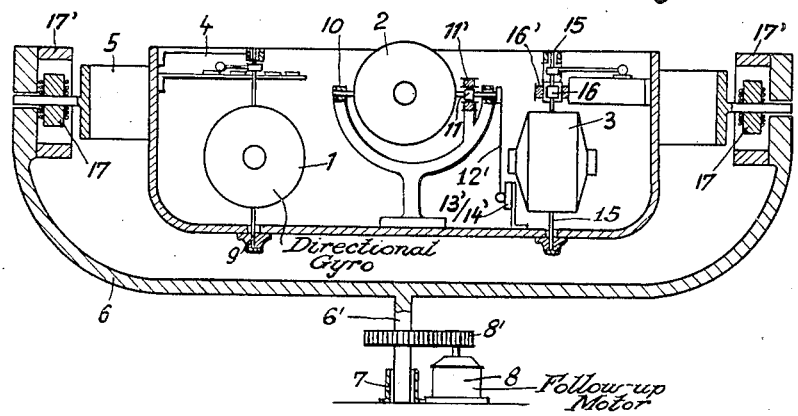
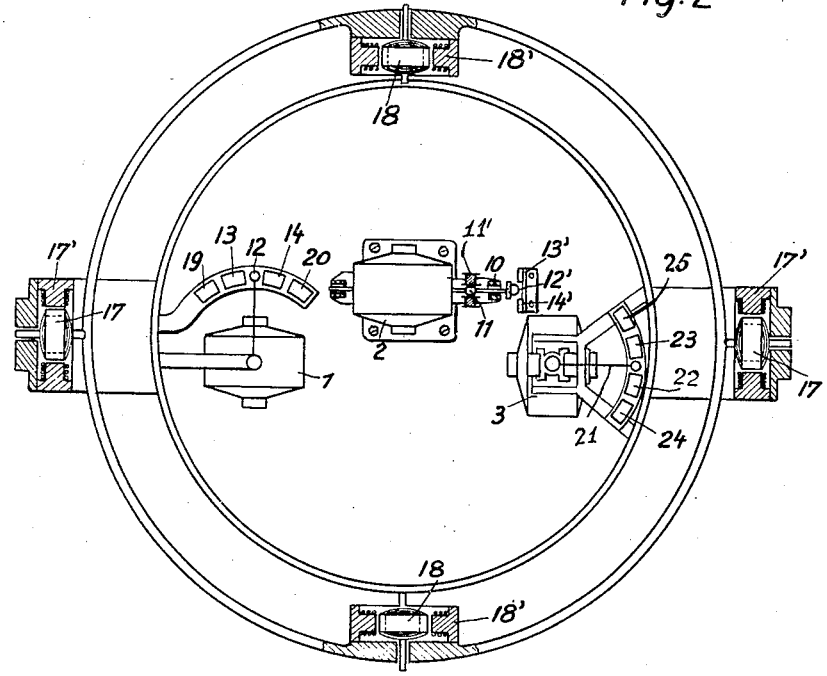

Oct. 10, 1933.　　　　J. M. BOYKOW　　　1,930,082
GYROSCOPIC COMPASS
Filed March 20, 1929　　3 Sheets-Sheet 2

Inventor
JOHANN MARIA BOYKOW
BY
ATTORNEYS.

Oct. 10, 1933.  J. M. BOYKOW  1,930,082
GYROSCOPIC COMPASS
Filed March 20, 1929  3 Sheets-Sheet 3
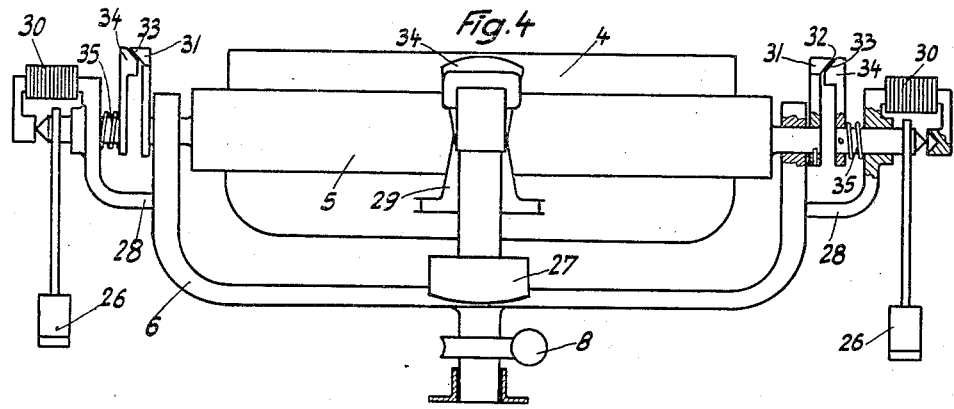
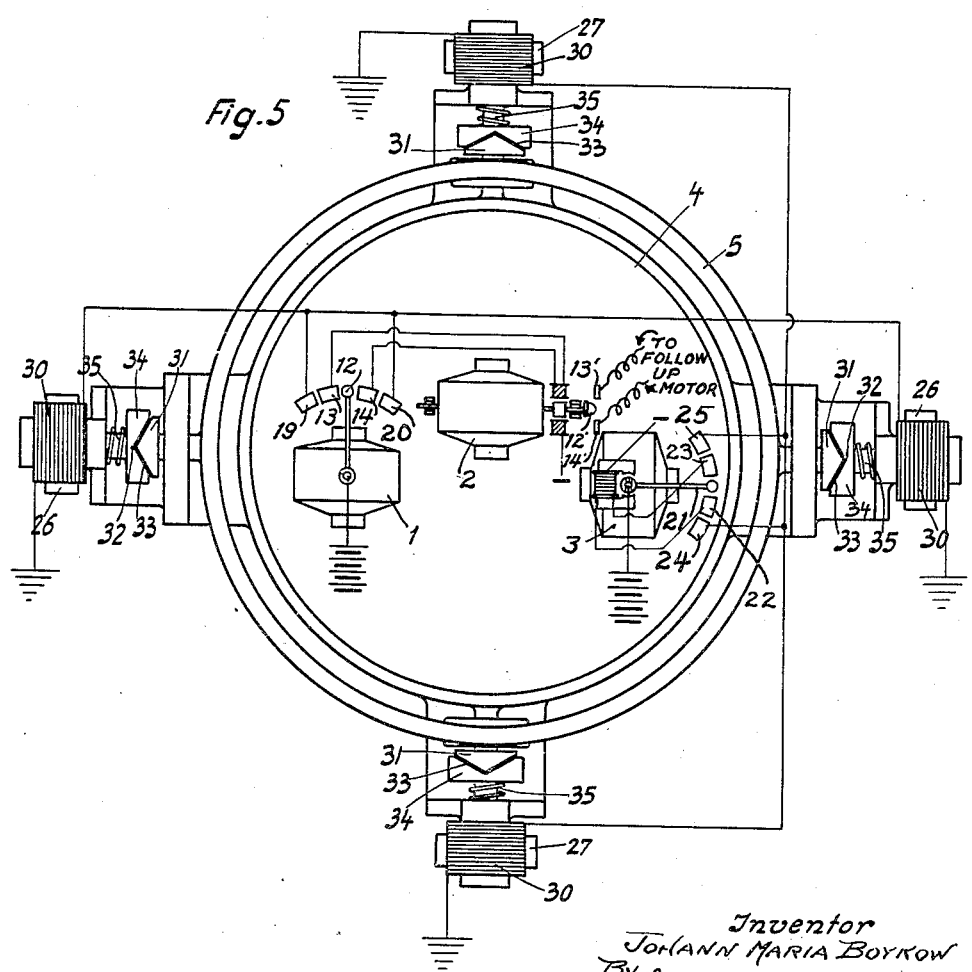
Inventor
JOHANN MARIA BOYKOW Patented Oct. 10, 1933

1,930,082

UNITED STATES PATENT OFFICE 1,930,082

GYROSCOPIC COMPASS

Johann Maria Boykow, Berlin-Lichterfelde-West, Germany, assignor to Messgerate Boykow, G. m. b. H., Berlin-Lichterfelde-West, Germany, a corporation Application March 20, 1929, Serial No. 348,474, and in Germany March 23, 1928

8 Claims. (Cl. 33—226)

It is known that when the directing gyroscope of a gyroscopic compass has its centre of gravity at a low level in the gimbal suspension, the period of oscillation of the gyroscope will become smaller as the centre of gravity is lowered. However, no use could hitherto be made of this useful property because owing to the low centre of gravity, ballistic disturbances grow proportionally to the diminution of the period of oscillation of the gyroscope.

This invention relates to a gyroscopic compass in which errors produced by these disturbances are practically eliminated notwithstanding the low centre of gravity of the directing gyroscope.

According to this invention, a follow-up frame carries the gimbal suspension in which the directing gyroscope with low centre of gravity is hung. The follow-up motor of this frame is controlled by a second gyroscope mounted so as to be in neutral equilibrium in the gimbal suspension and having only one degree of freedom of precession about a horizontal precessional axis. A device is disposed on the precessional axis of this gyroscope; this device is operated by the directing gyroscope when the latter precesses, and the said device exerts a torque on the second gyroscope in a direction depending upon the direction of precessional movement of the directing gyroscope. The device may be a coil of the Deprez type (i. e. a coil swinging in a magnetic field) operated by the directing compass through the medium of a contactor and in a direction depending upon its precessional movements.

In a device of this type, the system is set in a North—South direction by the follow-up motor, independently of the amplitude of the oscillations of the directing gyroscope about its precessional axis. When the directing gyroscope causes the torque (which must be maintained small) to act about the precessional axis of the second or relay gyroscope, the latter swings about the precessional axis and sets the follow-up motor into operation. As a consequence, a counter-precessional movement of the relay gyroscope is produced and the follow-up motor is automatically thrown out of operation.

If a compass is mounted upon a movable support it is subjected to more or less strong accelerating influences. In such case, its precessional oscillations are the greater the lower its centre of gravity. On the other hand, as stated above, a gyroscopic compass with low centre of gravity has the great advantage of a low period of oscillation. The problem is therefore to make harmless the large precessional oscillations of a gyroscopic compass with low centre of gravity.

The accelerations upon the gyroscopic compass will indeed on the average compensate each other fairly well during a rather long trip and the compass will in every case on the average indicate the north-south position. In splite of this, however, if the gyroscopic compass has a low center of gravity, steering according to such a gyroscope is very poor on account of the large precessional oscillations, as the gyroscope is too unsteady. The purpose of the relay gyroscope according to the present invention is to keep the direction indicating housing, which is adjusted by the gyroscope, unaffected as much as possible by the precessional oscillations of the gyroscopic compass, and thus to stabilize the compass housing which is connected with the direction indicator, or, in other words, to transmit the precessional oscillations of the gyroscope to the housing only in greatly reduced degree. The true gyroscopic compass with its low center of gravity in the housing can then make any oscillations no matter how large without disturbing the control, as the housing with the direction indicator connected therewith remains comparatively steady.

According to this invention, errors produced when under way and known as errors due to rolling or pitching motions are eliminated by mounting a third gyroscope in the gimbal suspension carrying the two gyroscopes described in the foregoing. This gyroscope has only one degree of freedom of precession about a precessional axis parallel to that of the first gyroscope, the axis of rotation of this third gyroscope being at right angles to that of the first gyroscope. This right-angle relation between the two axes is maintained by automatic control. To this end, the gyroscope, when deviating from its direction (which is substantially East—West), sets up torques which return it thereto.

The precessional oscillations produced by acceleration are very great owing to the pendulous mounting of the first and third gyroscopes. These oscillations are limited by a device provided by the invention and by means of which the torque exerted on the pendulous structure formed by the gimbal suspension and by the first and third gyroscopes, is compensated when the precessional oscillation of the gyroscopes reaches a pre-determined limit. A first method of carrying this into effect is to dispose sustaining coils on the pivot pins of the gimbal suspension: these coils are thrown into operation by the gyroscopes when precessional oscillation reaches a pre-determined amplitude so that acceleration torques are compensated. Another method is to dispose the gyroscopes in the gimbal suspension in such a manner that they are in neutral equilibrium therewith. Weights having a low center of gravity are connected to the frame carrying the gyroscopes so as to form a pendulous mass. These weights may be disconnected from the frame when the gyroscopes reach a certain precessional angle. One method of obtaining this result is to connect the weights to the frame by clutches and to release these clutches by means of electromagnets.

In the accompanying drawings:

Figure 1 is a sectional elevation of a gyroscopic compass embodying the invention;

Figure 2 is a plan of Figure 1 partly in section; and

Figures 4 and 5 show in side elevation and top plan view respectively a modified form of the invention.

Figure 3:
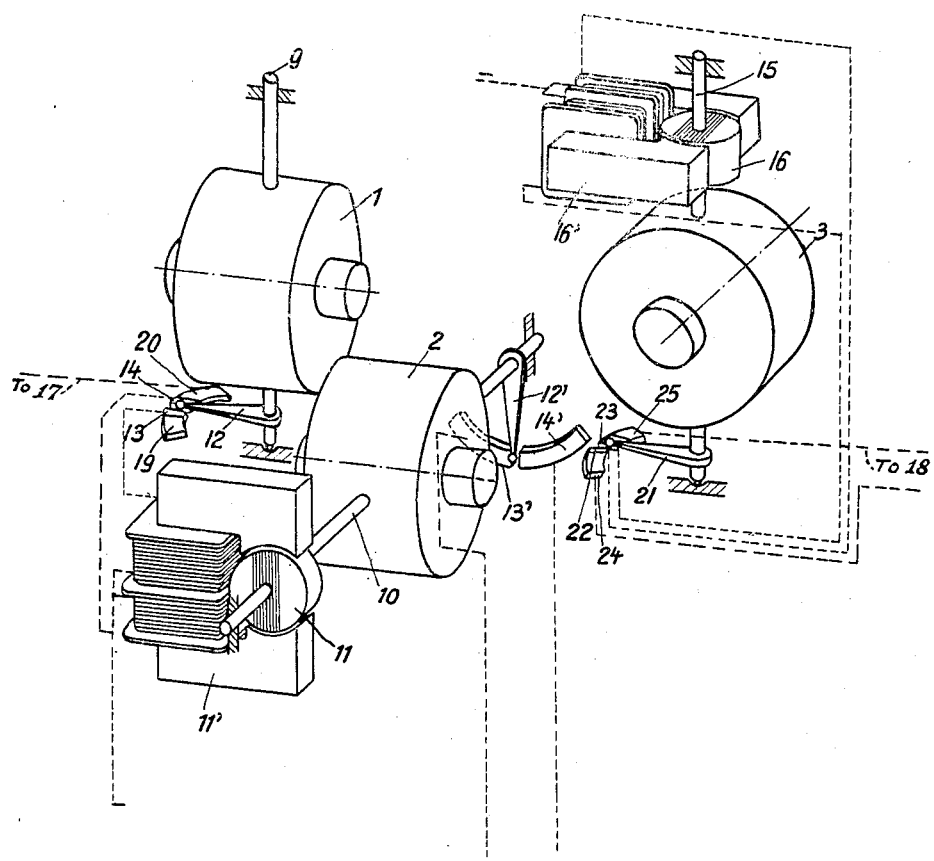
Figure 3 is a diagrammatic view showing the gyroscope coils and connections on an enlarged scale.

The three gyroscopes 1, 2 and 3 are mounted in a casing 4 oscillatably suspended in a gimbal ring 5 carried on a frame 6 which may be angularly moved by a follow-up motor 8 about a vertical axis 7. As shown in Fig. 1, the center of gravity of the gyroscope 1 is below the pivotal axis of the gimbal ring 5.

The axis of rotation of the gyroscope 1 is horizontal and its precessional axis 9 is vertical; this is the directing gyroscope which according to known gyroscopic laws takes up a substantially North—South direction.

The gyroscope 2 has a horizontal axis of rotation, a horizontal precessional axis 10 and, unlike the gyroscope 1, is supported in neutral equilibrium. This is the control relay for the follow-up motor 8 acting on the axis 6' of the frame 6 by means of a pair of spur wheels 8'. A Deprez coil 11 is disposed on the precessional axis of the gyroscope 2 and is thrown in and out of operation in accordance with the precessional movements of the gyroscope 1 by means of a contact arm 12 co-operating with contacts 13, 14. The gyroscope 2 controls the follow-up motor 8 with the aid of a similar contact arm 12' and similar contacts 13; 14'.

The general arrangement of the gyroscope 3 is the same as that of the gyroscope 1, with the exception that its horizontal axis of rotation is at right angles to the mean position of the axis of rotation of the gyroscope 1. This is obtained by disposing a Deprez coil 16 on the precessional axis 15 of the gyroscope 3 in a magnetic field 16; the gyroscope automatically controlling the field by means of a contact arm 21 and stationary contacts 22, 23.

Sustaining coils 17 and 18 are mounted on the gimbal pins in magnetic fields 17' and 18', the coils 17 being operated by the gyroscope 1 and the coils 18 by the gyroscope 3. The coils 17 are thrown in and out of operation by means of contacts 19 and 20 which are positioned, relatively to the direction of angular movement of the contact arm 12, beyond the contacts 13 and 14, i. e. they come into operation when the precessional oscillations of the gyroscope 1 overstep the angle covered by the contacts 13 and 14. If so, the coil 11 is cut out, but this is immaterial because this coil is soon set into operation again owing to the return moment of the coil 17.

The gyroscope 3 operates the coils 18 by means of contacts 24, 25 disposed exactly as the contacts 19 and 20 on either side of the contacts with the aid of which the said gyroscope operates the coil 16. Thus the coils 18 are operated when the angular movement of the arm 21 reaches a predetermined value.

The gyroscopic compass just described operates as follows:

When the compass is set into operation, the gyroscope 1 moves to the North—South direction very quickly as compared with the directing gyroscope of ordinary gyroscopic compasses, for example, in five minutes. The gyroscope 1, through the contact devices 12, 13, 14 and coil 11, exerts a torque upon the gyroscope 2 through whose contact mechanism 12', 13', 14' the follow-up motor is switched in, in the one or the other direction of rotation, until the whole system suspended on the frame 6 is turned to the North—South direction, the switch 12 of the gyroscope 1 then lying in the off position. In order that this should also take place rapidly, the torque of the coil 11 may be increased during the starting period only so that this coil affords the follow-up motor the possibility of moving the frame more rapidly than while the compass is in normal operation. Such increase in the torque of coil 11 may be easily accomplished by increasing the current through such coil, as by inserting a resistance in the circuit of the coil 11 and contacts 12, 13, 14, such resistance being cut out during the starting period.

When all the gyroscopes are started and the vehicle is in motion, the gyroscope 2 will maintain the entire system in azimuth, because during rotation about the vertical axis, the gyroscope 2 precesses about the axis 10, and by means of the contacts 12', 13', 14' switches in the follow-up motor 8 in such a manner, that the system remains in azimuth disregarding inaccuracies. If, in time, deviations from the North—South directions occur, the gyroscope 1 becomes operative and by means of the contacts 12, 13, 14 and the coil 11 affects the gyroscope 2 in such a manner that a correction of the deviation takes place.

In addition the gyroscope 1 always oscillates more or less about the North—South direction during the travel of the vehicle, except when the stabilizing coils 17, 17', 18, 18' cut out the action of acceleration forces upon the gyroscope 1.

When the gyroscope 1 swings about its precessional axis 9, it sets the coil 11 of the relay gyroscope 2 into operation, but the torque exerted by this coil is maintained small in the course of normal operation. Consequently, the counter-precessional movement of the gyroscope 2 about the axis 10 cuts out the follow-up motor 8 (which was thrown into operation by the gyroscope 2 under the action of the coil 11) when the angular velocity of the frame 6 becomes quite small. This means, in practice, that the oscillation movements of the follow-up frame 6 and therefore of the whole compass system about the North—South direction may always be reduced with respect to the oscillation of the directing gyroscope 1 by means of the gyroscope 2.

Since the gyroscope 3, when in its mean position, is at right angles to the mean position of the gyroscope 1, the system is entirely proof against errors due to rolling or pitching motions and the latter are eliminated.

Finally, owing to the circumstance that the coils 17, 17' and 18, 18' sustain the casing 4 (carrying the gyroscopes) against acceleration thrusts, precessional oscillations of the gyroscopes 1 and 3 are prevented from becoming excessive under the action of acceleration thrusts.

In Figures 4 and 5 the gyroscope casing 4 is shown with its gimbal ring 5 in the same way as in Figures 1 and 2. The sustaining coils 17 and 18 of Figures 1 and 2 are, however, replaced by pendulums 26 and 27 which are pivotally suspended in brackets 28 and . respectively, said brackets forming part of or being secured to the frame 6 and the casing 4 respectively. As shown in Figures 4 and 5 electromagnetic coils 30 are located adjacent to the gimbal axes. Arms 34 are connected with the pendulums 26 and 27 and are provided with bevelled recesses 32 cooperating with members 31 fixed on the gimbal axes, said members 31 fitting the recesses 32 of the arms 34 and in combination with the latter constituting clutches whereby the pendulums 26 and 27 are coupled to the frame 5 and the casing 4 respectively; springs 35 serve to press the pendulums 26 and 27 with the arms 34 inwardly so that said pendulums, through the medium of the clutches 32—33 are maintained in coupled connection with the gimbal axes.

When the gyroscopes 1 or 3 respectively precess so far as to engage the contacts 19, 20 or 24, 25 respectively, the corresponding coils 30 are electrically energized. The arms 34 and the associated pendulums 26 and 27 are drawn by the attraction of the coils against the tension of the springs 35, whereby the arms 34 and members 31 are disengaged so that the pendulums 26 are disconnected from the frame 5, and the pendulums 27 are disconnected from the casing 4. As soon therefore as the deflection of the gyroscopes is sufficient to bring the contact arms 12 and 21 into engagement with the aforesaid contacts, the pendulums 26 and 27 will be disconnected from the frame 5 and casing 4. The moment the coils 30 are de-energized the springs 35 become operative, and recouple the pendulums 26 and 27 to the frame 5 and casing 4.

As previously stated, the gyroscopes are so arranged in the casing 4, or relatively the latter is so mounted in the frame 5, that the casing 4 with the gyroscopes and all other parts located therein and the frame 5, when they are not influenced by the pendulums 26 and 27, are in neutral equilibrium. As a result, at the moment when the deflection of the gyroscopes 1 and 3 becomes so great that the contacts 19, 20 and 24, 25 are reached by the respective contact arms 12 and 21, every influence of acceleration forces or ballistic disturbances on the gyroscope system is eliminated. As the casing 4 is suspended in neutral equilibrium, after release of the pendulums, the subsequent acceleration forces always pass through the center of gravity of the system, and accordingly cannot develop a torque on the system. Consequently, the arrangement shown in Figures 4 and 5 operates in such a manner that with a predetermined precession deflection of the gyroscopes 1 and 3, the action of the accelerating forces, which produces the precession deflection, is interrupted by the disconnection of the pendulums 26 and 27, so that in this manner the precession deflections of the gyroscopes cannot exceed a predetermined maximum.

What I claim is:

1. A gyroscope compass comprising a follow-up frame, a gimbal suspended on said frame, a directing gyroscope mounted upon said gimbal suspension with its center of gravity below the gimbal axis, a second gyroscope having two degrees of freedom one about a horizontal precessional axis and mounted in the gimbal suspension in such manner that its precessional axis passes through its center of gravity, a follow-up motor for said frame controlled by said second gyroscope, and mechanism operated by said directing gyroscope when the latter precesses and effective to exert a torque on said second gyroscope in a direction determined by the direction of precessional movement of the directing gyroscope.

2. A gyroscope compass comprising a follow-up frame, a gimbal suspended on said frame, a directing gyroscope mounted upon said gimbal suspension with its center of gravity below the gimbal axis, a second gyroscope having two degrees of freedom one about a horizontal precessional axis and mounted in the gimbal suspension in such manner that its precessional axis passes through its center of gravity, a follow-up motor for said frame controlled by said second gyroscope, mechanism operated by said directing gyroscope when the latter precesses and effective to exert a torque on said second gyroscope in a direction determined by the direction of precessional movement of the directing gyroscope, a third gyroscope mounted in the gimbal suspension and having only one degree of freedom about a precessional axis paralled to that of the first gyroscope, and means operative to maintain the axis of rotation of said third gyroscope perpendicular to the axis of rotation of the first gyroscope.

3. A gyroscopic compass comprising a support, a gimbal suspended on said support, a plurality of gyroscopes rotating about horizontal axes at a substantial angle to each other and each mounted for precession about an axis at an angle normal to its axis of rotation mounted on said gimbal with their centers of gravity below the gimbal axis and forming a pendulum with such gimbal, pivot pins for said gimbal, and means operative when the precessional angle of said gyroscopes reaches a predetermined amplitude to counteract the torque exerted by accelerations upon the pendulum, said means to counteract comprising stabilizing coils mounted on said pins and mechanism controlled by the gyroscopes for throwing said coils into operation when said predetermined amplitude is reached.

4. A gyroscope compass as set forth in claim 2, including means operative when the precessional angle of the said first and third gyroscopes reaches a predetermined amplitude to counteract the torque exerted by accelerations upon the pendulum.

5. A gyroscope compass as set forth in claim 2, said gimbal suspension including pins, and means operative when the precessional angle of the said first and third gyroscopes reaches a predetermined amplitude to counteract the torque exerted by accelerations upon the pendulum, said last mentioned means comprising torque-applying coils mounted on said pins, and mechanism controlled by the gyroscopes for throwing said coils into operation when said predetermined amplitude is reached, each gyroscope controlling the coils on pins at right angles to its spin axis.

6. A gyroscopic compass comprising a follow-up frame, a gimbal mounting suspended on said frame, a pendulous arrangement supported by said gimbal mounting with its center of gravity below the gimbal axes, coils mounted adjacent the pivots of the gimbal mounting, said arrangement including a plurality of gyroscopes each mounted in said mounting for precession about an axis at an angle normal to its axis of rotation, and means operated by said gyroscopes when their precessional angles reach a predetermined amplitude caused by ballistic pressures to energize the respective coils to eliminate the deviations otherwise caused by said pressures.

7. A gyroscopic compass comprising a follow-up frame, a gimbal mounting suspended on said frame, a pendulous arrangement supported by said gimbal mounting with its center of gravity below the gimbal axes, said arrangement including a second frame mounted in said gimbal mounting, a plurality of gyroscopes each mounted in said second frame for precession about an axis at an angle normal to its axis of rotation, weights having their centers of gravity below the gimbal axes connected to said second frame, and means operated by said gyroscopes when their precessional angles reach a predetermined amplitude caused by ballistic pressures to disconnect said weights from said second frame, whereby to eliminate the deviations otherwise caused by said pressures.

8. A gyroscopic compass comprising a follow-up frame, a gimbal mounting suspended on said frame, a pendulous arrangement supported by said gimbal mounting with its center of gravity below the gimbal axes, said arrangement including a second frame mounted in said gimbal mounting, a plurality of gyroscopes each mounted in said second frame for precession about an axis at an angle normal to its axis of rotation, pendulous weights mounted to swing about the gimbal axes with their centers of gravity below said axes, clutches normally connecting said weights to said second frame, and electromagnetic means operated by said gyroscopes when their precessional angles reach a predetermined amplitude caused by ballistic pressures to release said clutches and thereby to disconnect said weights from said second frame, whereby to eliminate deviations otherwise caused by said pressures.

JOHANN MARIA BOYKOW.